(12) United States Patent
Proctor, Sr.

(10) Patent No.: US 11,896,169 B2
(45) Date of Patent: *Feb. 13, 2024

(54) METHOD TO MANUFACTURE SUBSTRATE WITH LATENT WETTING DEVICE

(71) Applicant: Material Encapsulation Inc., Raleigh, NC (US)

(72) Inventor: Charles Proctor, Sr., Raleigh, NC (US)

(73) Assignee: Material Encapsulation Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/113,263

(22) Filed: Dec. 7, 2020

(65) Prior Publication Data
US 2021/0085132 A1    Mar. 25, 2021

Related U.S. Application Data

(63) Continuation of application No. 16/293,764, filed on Mar. 6, 2019, now Pat. No. 10,888,202, which is a
(Continued)

(51) Int. Cl.
*D21H 27/32* (2006.01)
*D21H 27/10* (2006.01)
(Continued)

(52) U.S. Cl.
CPC ............. *A47K 10/16* (2013.01); *D21H 27/02* (2013.01); *D21H 27/10* (2013.01); *D21H 27/32* (2013.01);
(Continued)

(58) Field of Classification Search
CPC .. B32B 27/306; D21H 27/002; D21H 27/007; A47L 13/17
(Continued)

(56) References Cited

U.S. PATENT DOCUMENTS 3,921,802 A    11/1975  Thompson
4,430,013 A *  2/1984   Kaufman ............ A61M 35/003
                                                    401/133
(Continued)

FOREIGN PATENT DOCUMENTS

DE    4447535 A1    8/1999
JP    47-38355 B    12/1972
(Continued)

OTHER PUBLICATIONS

Communication dated Oct. 9, 2018, from the European Patent Office in counterpart European Application No. 16762567.2.
(Continued)

*Primary Examiner* — Anthony D Stashick
*Assistant Examiner* — Raven Collins
(74) *Attorney, Agent, or Firm* — Sughrue Mion, PLLC

(57) ABSTRACT

Dry, plied roll paper is transformed into hand wetted roll paper that may be used either dry, or selectively hand wetted using a wetting device. The device is then shaped into a container filled with an anti-bacterial cleaning agent, or other agent, and assembled on the paper ply. The hand wetted paper ply can be used as paper towels or toilet paper for dry and/or wet hygienic cleaning.

4 Claims, 21 Drawing Sheets

Related U.S. Application Data continuation of application No. 15/981,631, filed on May 16, 2018, now Pat. No. 10,271,694, which is a continuation-in-part of application No. 15/067,243, filed on Mar. 11, 2016, now Pat. No. 10,161,085.

(60) Provisional application No. 62/507,303, filed on May 17, 2017, provisional application No. 62/132,208, filed on Mar. 12, 2015.

(51) Int. Cl.
| | | |
|---|---|---|
| *B32B 3/08* | (2006.01) | |
| *B32B 29/00* | (2006.01) | |
| *A47K 10/16* | (2006.01) | |
| *D21H 27/02* | (2006.01) | |
| *B32B 27/30* | (2006.01) | |
| *B32B 37/22* | (2006.01) | |

(52) U.S. Cl.
CPC ............... *B32B 3/08* (2013.01); *B32B 27/306* (2013.01); *B32B 29/005* (2013.01); *B32B 37/22* (2013.01); *B32B 2305/34* (2013.01); *B32B 2305/54* (2013.01); *B32B 2554/00* (2013.01)

(58) Field of Classification Search
USPC .......................................... 428/321; 401/196
See application file for complete search history.

(56) References Cited

U.S. PATENT DOCUMENTS

| | | | |
|---|---|---|---|
| 4,511,533 A * | 4/1985 | Guadagno | ................ C12Q 1/28 436/66 |
| 4,515,703 A | 5/1985 | Haq | |
| 4,696,393 A | 9/1987 | Laipply | |
| 6,613,144 B1 | 9/2003 | Loertscher et al. | |
| 7,240,790 B2 | 7/2007 | Wendel et al. | |
| 7,914,891 B2 | 3/2011 | Amundson et al. | |
| 8,097,322 B1 * | 1/2012 | Osorio | ................... A47K 10/16 428/43 |
| 8,113,730 B2 * | 2/2012 | Maloney | .............. B65D 75/585 206/229 |
| 8,178,176 B1 | 5/2012 | Roberts | |
| 8,192,841 B2 | 6/2012 | Amundson et al. | |
| 9,668,947 B2 | 6/2017 | Tonani et al. | |
| 10,271,694 B2 | 4/2019 | Proctor, Sr. | |
| 2003/0084914 A1 | 5/2003 | Simon | |
| 2013/0219631 A1 | 8/2013 | Littig et al. | |
| 2014/0173844 A1 | 6/2014 | Pickard, III | |

FOREIGN PATENT DOCUMENTS

| | | |
|---|---|---|
| JP | 2013-6402 A | 1/2013 |
| WO | 2000/70009 A1 | 11/2000 |
| WO | 0071790 A1 | 11/2000 |
| WO | 2001/26530 A1 | 4/2001 |
| WO | 0147705 A1 | 7/2001 |

OTHER PUBLICATIONS

International Search Report, dated Jun. 10, 2016, from the International Bureau in counterpart International application No. PCT/US2016/021903.

Written Opinion, dated Jun. 10, 2016, from the International Bureau in counterpart International application No. PCT/US2016/021903.

Communication dated Apr. 23, 2019, from the Japanese Patent Office in counterpart application No. 2017-567038.

\* cited by examiner

METHOD TO MANUFACTURE SUBSTRATE WITH LATENT WETTING DEVICE

CROSS-REFERENCE TO RELATED APPLICATIONS

This application is a continuation of U.S. patent application Ser. No. 16/293,764 filed Mar. 6, 2019, which is a continuation of U.S. patent application Ser. No. 15/981,631 filed on May 16, 2018, which claims the benefit of Provisional U.S. Patent Application No. 62/507,303 filed on May 17, 2017, and is a continuation-in-part of U.S. patent application Ser. No. 15/067,243 filed on Mar. 11, 2016, which claims the benefit of Provisional U.S. Patent Application No. 62/132,208 filed on Mar. 12, 2015.

BACKGROUND OF THE INVENTION

Dry toilet paper and dry paper towels do not provide adequate hygienic cleaning which can lead to health problems. One would never wipe dirty dishes with dry paper and put them back into a cabinet, nor would one try to bathe using only a dry paper towel. Toilet care is not complete unless one can bathe with soap and water or use a product that provides moisture and a detergent. Similarly, dry paper towels cannot clean dried debris unless wetted.

In the case of dry toilet paper, manufacturers and marketers have had a difficult time promoting their product to the consumer because toilet care is a subject fraught with embarrassment and antipathy. The topic of toilet care cannot be easily conveyed using conventional advertising and promotion. As a result, most people believe that dry tissue is all that is needed for toilet care.

In 2001, a company in the dry toilet paper industry introduced a wet wipe dispenser which was never commercially successful. Lately, the industry has started marketing overly large wet wipes as supplements to dry toilet paper. Patents directed toward wetting materials have been bought by some manufacturers; however, none of these patents is specifically directed toward enhancing existing low-cost roll paper manufacturing with an integral wetting device that allows the consumer the essential ability to activate the device with one hand for the latent wetting of rolled paper goods.

Dry toilet paper on a roll was patented Dec. 27, 1891. It has been widely accepted and used for over six generations. It is inexpensive, readily available, convenient to use and easy to dispose of. The dispensers for dry toilet paper on a roll are ubiquitous. There is nothing known today that is better or less expensive than dry toilet paper for blotting moisture and removing waste remnants from the body. However, dry paper used alone presents health and hygiene problems that have yet to be solved.

Intrinsically people know that soap and water is needed to properly clean anything. Dry toilet paper on a roll has always been an incomplete product for hygienic cleaning because it leaves behind residue and stain on the body. The residue can contain pathogens which can lead to diseases such as urinary tract infections. Residual stain and residue left behind can also cause odor and garment soiling.

The toilet paper industry is aware of the above problems and has made attempts to deal with them, but no commercial product similar to the invention has materialized. However, a market has developed for toilet wet wipes, preferably used in combination with dry toilet paper, showing that many consumers are aware of the need for moisture in order to be hygienically clean after using the toilet. Unfortunately, wet wipes are expensive and require the use of two different products, the wet wipe in its container and dry toilet tissue. Some wet wipes are large and cause over-wetting, and may be a problem for sewer and septic disposal. Wet wipes that are currently available don't fit existing dry toilet paper dispensers, and there is often not a convenient place to store them.

SUMMARY OF THE APPLICATION

As with dry toilet tissue, paper towels on a roll are a common product in most homes. They are excellent for cleaning up spills and for drying wet surfaces. But they don't provide the moisture needed to clean stains or dried soil, and they don't have anti-bacterial properties that can help reduce harmful bacteria. It is possible to intersperse the latent wetting device between single-plies or multi-plies of perforated sheets of dry paper towels on a roll, allowing the consumer to have a dry towel, or to press or squeeze the sheet with one hand to produce a wetted towel. The towels can be used where there is no source of moisture available, such as a faucet or container of liquid; and, with the addition of anti-microbial agents to the device, the consumer is able to take advantage of the important health properties the invention can provide, such as disinfecting office and work places, computer keyboards, telephones, light switches, etc. Because it is more economical and more convenient to purchase one product that does the work of two separate products, there is a need to provide latent wetting capability to dry paper towels to allow the consumer the added utility and convenience of using the towel either dry, or wetted as needed.

It is an aspect of the invention to conveniently keep roll toilet paper in its existing form, adding latent wetting to the same roll at very low incremental cost. By adapting the manufacture of the invention to coincide with the existing low-cost manufacture of dry toilet paper on a roll, the invention allows consumers to purchase the new product in the same way they currently purchase toilet tissue, and continue to use their already in-place dispensers.

In the case of dry toilet paper, the addition of the described device to selected sheets of dry toilet paper enables the user to have the option of using every sheet of the toilet paper dry, or to convert selected dry sheets to wet sheets by squeezing the device with the digits of one hand, which results in a non-ejected release of the liquid agent by capillary action onto the paper for improved hygienic cleaning.

In the one embodiment, an anti-microbial cleaning agent is used in the device. The importance of a bacteria-killing agent is a primary embodiment of the invention. Each year, illness and lost time at work costs the U.S. billions of dollars due to infections attributed to contamination from bacteria such as Norovirus and *E. coli*. The incidence of these illnesses could be reduced by bathing or showering after using the toilet or after contact with disease laden surfaces, but those options are not always practical or available. The invention addresses this problem by providing a device containing both a detergent and an anti-microbial agent.

The embodiments provide selective latent wetting of the dry paper goods by using the existing roll goods largely in their current form, and selectively adding the one hand-openable device holding a liquid agent to the roll goods during their manufacture. The modification allows the goods to be packaged, transported, sold, dispensed, used and disposed of in substantially the same way that dry paper roll goods are currently being made and sold.

In the case of toilet care, latent wetting paper roll goods are significantly less expensive than using dry paper in combination with wet wipes. The latent wetting paper of the invention is one-hand activated, wets quickly, resists accidental breakage, has a moisture wrap to prevent agent evaporation before dispensation and retains its latent wetting ability when consumed on a daily basis. In the case of hand-wetted paper towels, which may not be used on a daily basis, a protective container to prevent evaporation is provided. The device is preferably made of materials that are both anaerobically and aerobically biodegradable.

In one embodiment of the invention, the device is inserted between selected sheets of toilet paper on a roll or selected sheets of paper towels on a roll. The sheets are all dry and can be used as such until a wetted sheet is needed for enhanced cleaning, at which time the sheet or sheets holding the device are squeezed by one hand and become wet. The wetting is non-ejecting and contained in a mostly circular dispersion in order for the user to have rapid access to the wetted sheet.

In another embodiment, the device is placed on the top of a roll of single ply or multiple ply paper during manufacturing. This embodiment would reduce paper wetting by capillary action.

According to one aspect of the application, a hand wetted paper product is provided, including a top paper ply; a bottom paper ply; and a wetting device disposed between the top paper ply and the bottom paper ply, the wetting device comprised of a bottom part made from a printed liquid substance cured into a solid and formed into a container with sides and a flange, and a top part made from a printed liquid substance and cured into a solid and formed into a cover with a sealed opening slit, wherein the wetting device is filled with a liquid agent.

According to another aspect of the application, the wetting device has two length dimensions parallel to the top paper ply and the bottom paper ply that are larger than another length dimension perpendicular to the top paper ply and the bottom paper ply to thereby minimize bulging and allow more sheets in a given roll or package. Additionally, the wetting device is flexible so that it conforms to the changing diameter of the paper product when wound on a roll.

According to another aspect of the application, the sealed opening slit is sealed with a frangible adhesive configured to provide a breaking force by a user's hand.

According to another aspect of the application the sealed slit is configured to be opened by applying pressure using two digits of a user's hand.

According to another aspect of the application, a pressure required to open the sealed opening slit is regulated by adjusting a width and a length of the opening slit, and by varying an amount, type and application of a frangible adhesive used to seal the opening slit.

According to another aspect of the application the wetting device is sized to hold a volume of the liquid agent, the volume ranging from 0.5 ml to 1 ml of the liquid agent, a sufficient amount to provide useable wetting to one sheet of 4"×4" toilet tissue or a 10.5"×11" paper towel.

According to another aspect of the application, the wetting device after being opened to release the liquid agent, is configured to become flatter, maintain its position between the top paper ply and the bottom paper play, remain in one piece to thereby prevent fragmentation into parts which may litter, contaminate or irritate human tissue.

According to another aspect of the application, the wetting device has a physical size configured to provide strength to an area being wetted, reduces wetted material deconstruction and pilling, and prevents digit push through of the wetted material on which it is formed.

According to another aspect of the application, the liquid agent is filled into the container while plied paper comprised of the top paper ply and bottom paper ply is being formed, the liquid agent can be in a liquid or frozen form when filled.

According to another aspect of the application, the container is made from materials, the material selected from the group consisting of polyvinyl alcohol, polyethylene oxide, and methyl cellulose, whereby the material is configured to dissolve when discarded after use when contacted with water.

According to another aspect of the application, wherein hand wetted paper product is usable in dry roll toilet paper and dry roll paper towels dispensers to provide hand wetted paper rolls.

According to another aspect of the application, a method for manufacturing the hand wetted paper product is provided and includes: providing a continuous web of the top ply paper; providing a continuous web of the bottom ply paper; forming the wetting device intermittently between the continuous web of the top ply paper and the continuous web of the bottom ply paper; and joining the continuous web of the top ply paper and the continuous web of the bottom ply paper together.

According to another aspect of the application, the forming of the wetting device intermittently between the continuous web of the top ply paper and the continuous web of the bottom ply paper includes: selectively applying liquid plastisol in the shape of the top part of the wetting device to adhere to the top paper ply; selectively applying liquid plastisol in the shape of the bottom part of the wetting device to adhere to a top side of the bottom paper ply; and filling the liquid agent in the bottom part.

According to another aspect of the application, the method further includes heat curing the adhered liquid plastisol of the top part and the bottom part into a solid plastic state ready for further processing.

According to another aspect of the application, the slit is formed in the top part of the container by printing the liquid plastisol on the top paper ply and leaving a void when printing or cutting the top part using a rotary slitting device.

According to another aspect of the application, the method further includes after forming the slit, sealing the slit with a frangible adhesive applied over the slit.

According to another aspect of the application, the method further includes printing an adhesive ring on the top part, a width of the adhesive ring being substantially a width of the flange on the bottom part.

According to another aspect of the application, the method further includes forming the bottom part of the wetting device into a shallow container.

According to another aspect of the application, the method further includes joining the top part and the liquid agent filled bottom part together to form the wetting device.

According to another aspect of the application, the liquid agent is frozen prior to being filled into the bottom part, the liquid agent configured to melt at room temperature.

According to another aspect of the application, wherein the process of selectively applying the liquid plastisol is accomplished by rotary screen printing.

According to another aspect of the application, the frangible adhesive is applied using rotary gravure printing.

According to another aspect of the application, the adhesive ring is printed using rotary gravure printing According to another aspect of the application, wherein the bottom part is formed into a shallow container by being embossed using an embossing roller and a backing roller.

BRIEF DESCRIPTION OF THE DRAWINGS

The above and other features and aspects of the present invention will become more apparent by describing non-limiting exemplary embodiments thereof with reference to the attached drawings in which.

DETAILED DESCRIPTION OF THE EXEMPLARY EMBODIMENTS

Figure 1A:
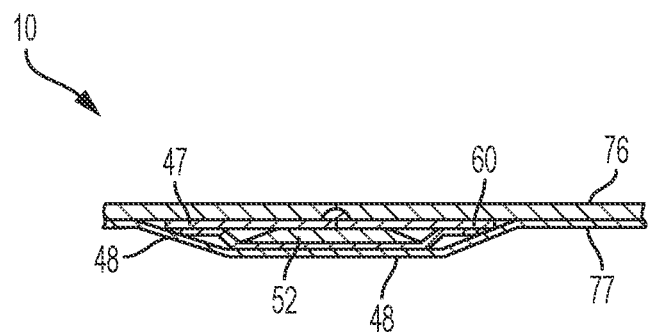
FIG. 1A-1D show a liquid agent holding device between two plies in accord with an aspect of the present application.

In the following embodiments described, a flat, thin, pliable device is disclosed. The device is comprised of two parts which are attached to the inside of plied paper. The bottom part is formed into a container with sides and a flange, and the top part is formed into a cover with an opening slit. The bottom container is filled with an active agent, and a sealing adhesive is applied to the top of the bottom flange or around the periphery of the bottom of the cover, or both. A frangible adhesive is applied on top of the opening slit in the cover. The bottom paper ply and top paper ply are brought together with a machine which presses only the flange and the periphery of the cover together, sealing the agent water-tight within the container.

A liquid agent holding and dispersing device 10 in accord with one aspect of the application is shown in FIGS. 1A-1D. The device 10 is configured to be opened to release the liquid agent using a user's hand. As shown in FIGS. 1A-1D, the device 10 is preferably used as an integral part of dry two-ply paper including a top paper ply 76 and a bottom paper ply 77 (tissue, toilet paper, wipes etc.) or in order to controllably wet the dry paper for use. As shown in the figures, the device includes a bottom container 48 joined to a top 47. In this embodiment, an adhesive is used to join the bottom container 48 with the top 47.

Figure 1B:
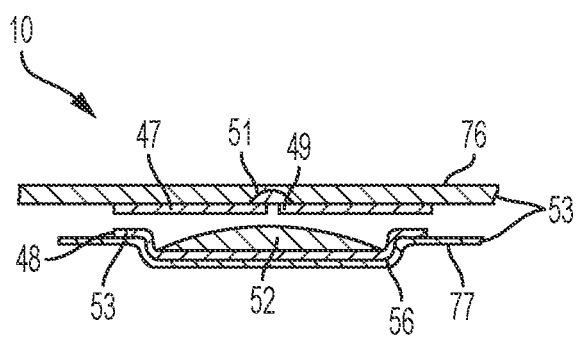
Figure 1C:
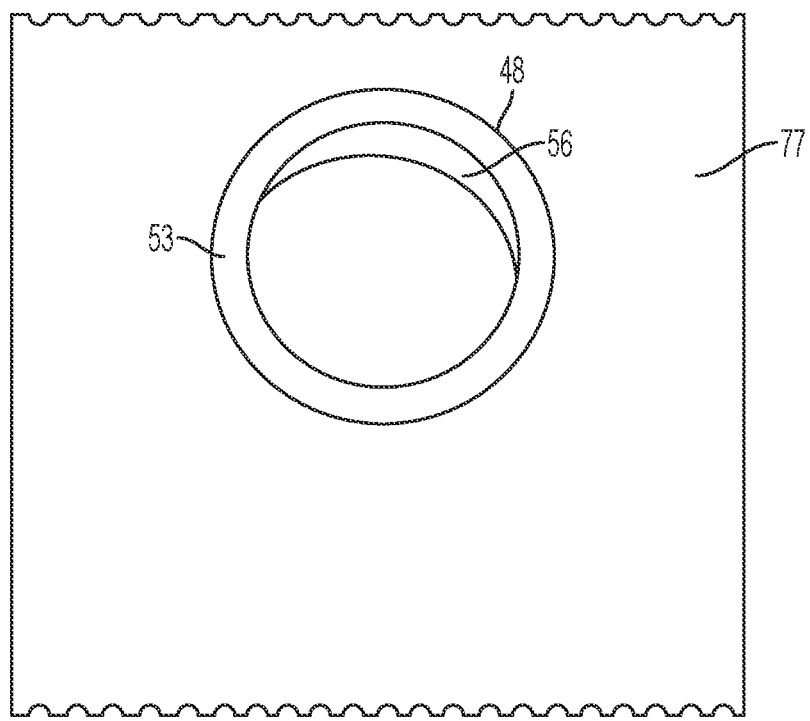
Figure 1D:
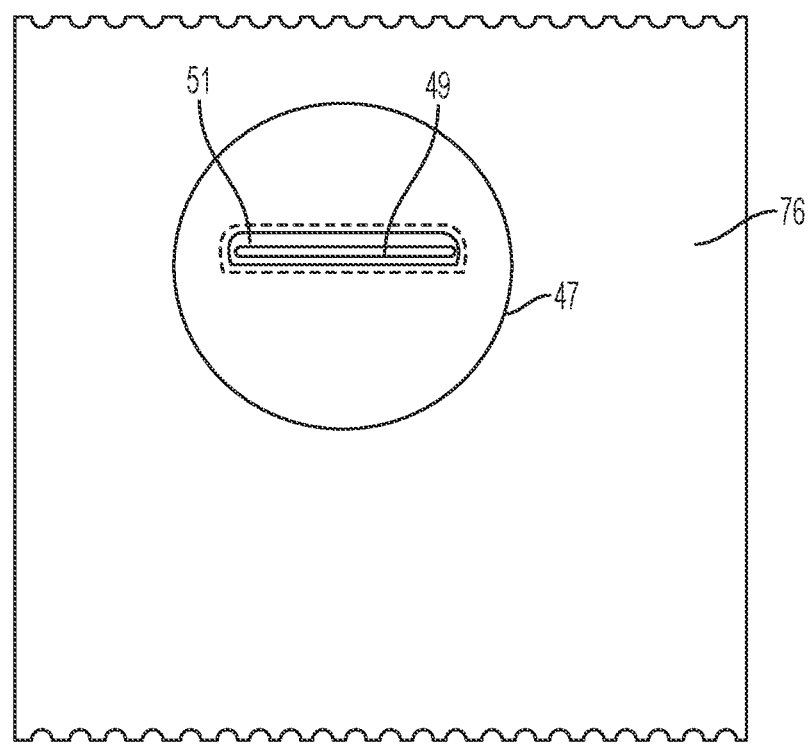

As shown in FIG. 1B, the device 10 has a bottom container 48, to hold the liquid agent 52. The container is made of plastic, which can be formed by being printed onto the bottom paper ply 77 during manufacturing. The size of the container can be adjusted; however, testing has shown that a size of 2 cm wide (horizontal in figure) and 2 mm deep (vertical in figure), holding about 0.5 ml of liquid, is useful for wetting a paper sheet. The peripheral flange 53 holds the top 47 to the bottom container 48 using an adhesive, or alternatively using some other sealing method, i.e., heating, moisture or other means. The substantially vertical side portion 56 of the bottom container 49, together with the width of the bottom container between the peripheral flanges 53, defines the volume of the device 10. In this embodiment, the vertical side portion 56 is 2 mm in height, but the height can range from 1 mm to 5 mm to provide a container that forms different volumes for different applications. The peripheral flange 53 has a width of 2 mm (0.5 mm to 3 mm in the case of the need to contain 0.5 ml of agent). A flange provides a larger area for adhesive application and an increased margin for sealing registration between the top 47 and bottom 48 when the top paper ply 76 and the bottom paper ply 77 are joined together, thereby reducing accidental leakage of agent 52.

The device 10 also includes a slit portion 49 sealed with a sealing agent 51. The slit portion 49 and sealing agent 51 are configured to control the release of the liquid agent when depressed by a user's finger or squeezed by hand. This sealed slit portion 49 is designed to fail when an adequate amount of force is exerted on the device so that the liquid agent 52 can be released when desired. In this embodiment, only a single slit is used, but the device 10 may be configured with multiple slits. While the liquid agent 52 may occupy the full internal volume of the device, a portion of the internal volume of the device 10 may include a gas.

The liquid agent used in the device can have many different properties. An agent having a viscosity which allows it to spread onto the paper by capillary action is most useful. Also, a primary purpose of the invention being to clean sanitarily, it is useful for the agent to be anti-bacterial. The liquid agent can be inserted into the container of the device in a frozen state during manufacturing to avoid any liquid spilling onto the paper.

The slit or slits 49 on the device 10 can be adjusted in size to control the release of the liquid agent onto the paper. They are resealed with a frangible adhesive, which can also control the breakability of the slit by adjusting the thickness of the application of the adhesive, the width of the application, and the type of adhesive.

Figures 1E, 1F:
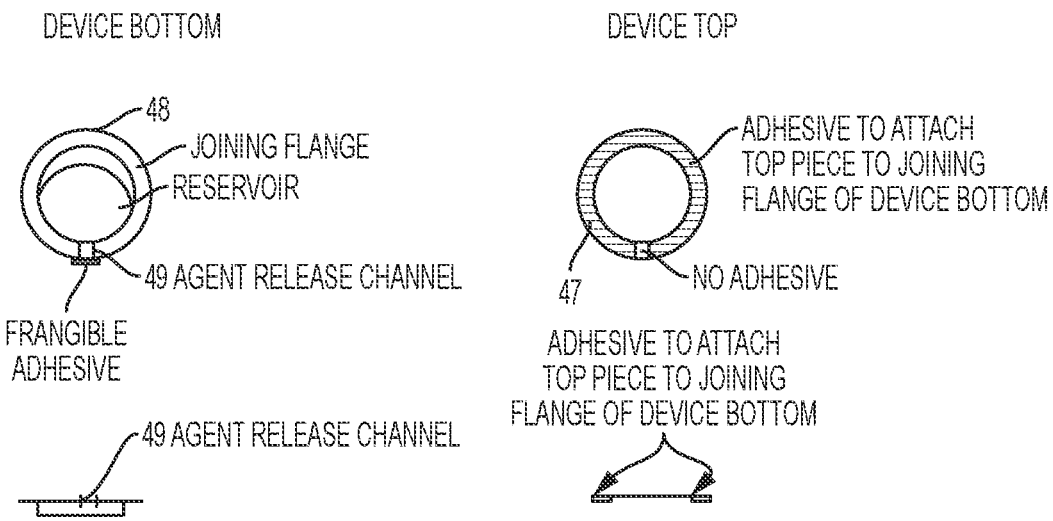
FIG. 1E-1G show a liquid agent holding device according to another aspect of the present application.
Figure 1G:
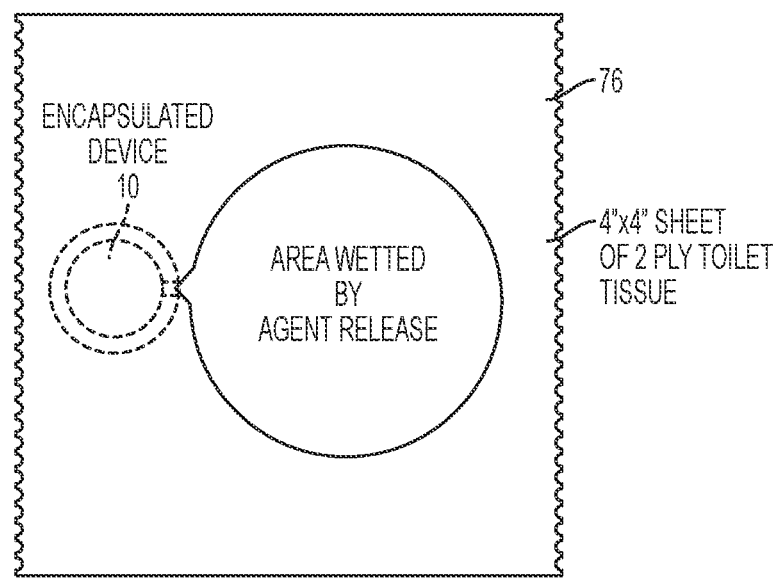

FIGS. 1E-1G show another embodiment of the device 10. In this embodiment, the slit 49 (channel) is formed and disposed on a side of the bottom container 48. This position permits a more exacting control over the direction of expulsion of the liquid agent when pressed by a user. The frangible adhesive is then applied to the slit 49 on the bottom container to seal this area. The device 10 is then formed with the bottom container 48 is mated with the top 47 as described above. Additionally, as shown in FIG. 1F, the adhesive applied to join the top 47 to the bottom container 48, may be omitted in a region of the outer surface at a location corresponding to the slit 49.

In view of this slit 49 location in FIG. 1E, the wetting areas of the liquid agent can be controlled. For example, in the case of use with a tissue material, the device can be placed on the edge of the sheet, and the dispersion of the liquid agent can be directed more effectively to the center and other side of the sheet.

Figure 2A:
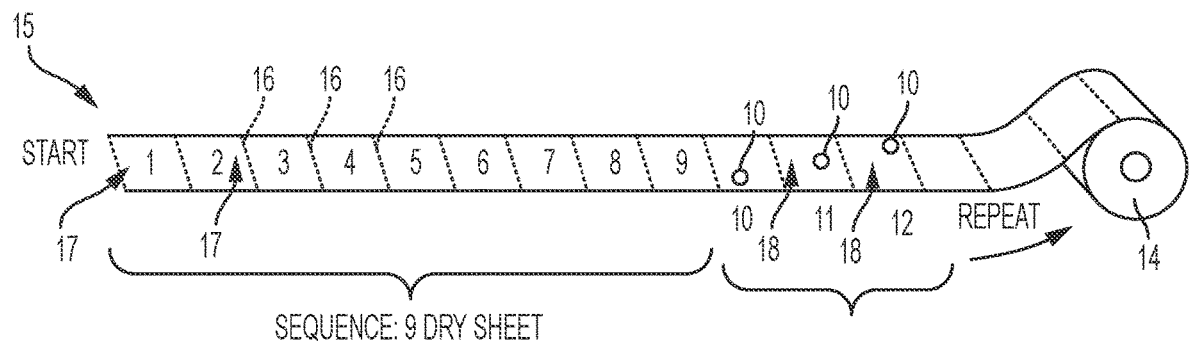
FIGS. 2A-2D show liquid agent holding device spacing in accord with various aspects of the present application.
Figure 2B:
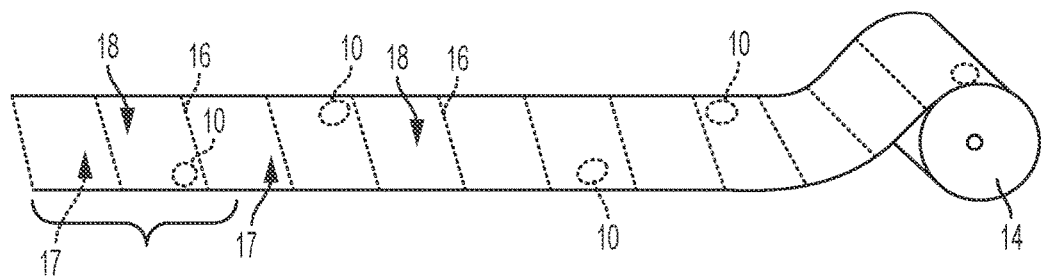
Figure 2C:
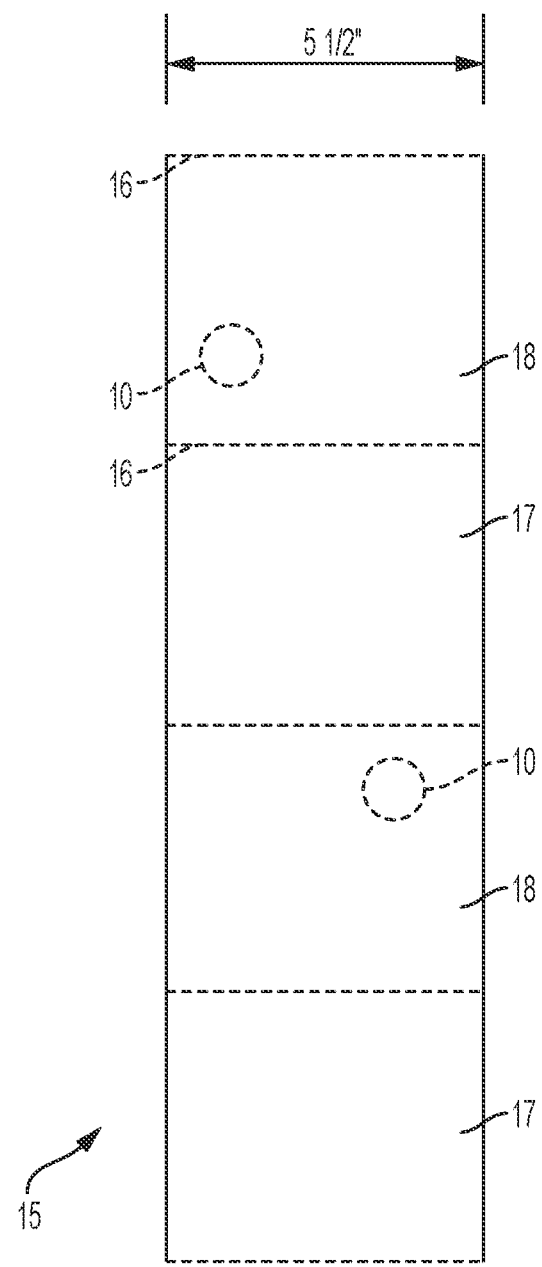
Figure 2D:
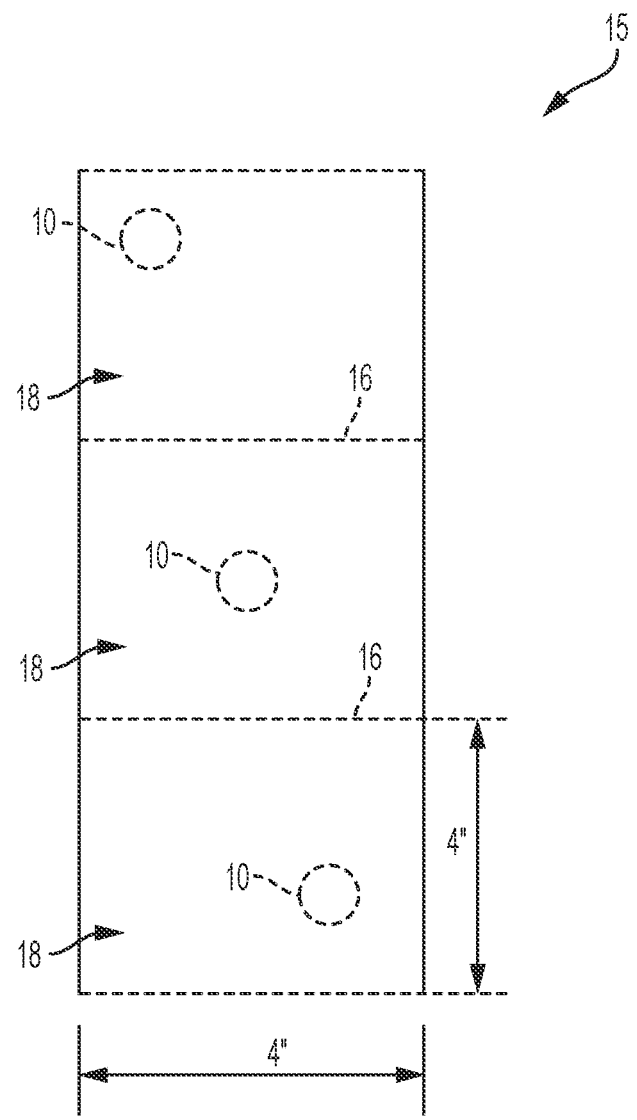

As shown in FIGS. 2A-2D, the device 10 can be placed either on the surface of a paper sheet or disposed between two plies of a paper sheet 15. FIG. 2A shows an embodiment in which the device 10 is placed intermittently on individual sheets that are separated by perforations 16. The roll of perforated paper is shown partially unfurled for purposes of explanation. In this embodiment, 9 dry sheets (not containing a device 10) are followed by three latent wetting sheets (each containing a device 10). As shown in FIG. 2D, the device 10 is placed on three latent wetting sheets 18. However, to promote an even roll diameter across the width of the roll 14, the devices 10 are staggered across the width on consecutive sheets 18. This prevents a bulge from forming on the outer surface of the roll in a particular location. As illustrated in FIG. 2D, the first sheet has a device 10 disposed on the left side of the sheet, the second sheet has a device 10 disposed in the center of the sheet, and the third sheet has a device 10 disposed on the right side of the sheet in the width direction. It is worthwhile to note that the staggering among consecutive sheets may be performed in other patterns.

In another embodiment as shown in FIG. 2B, the device 10 may be disposed on alternate sheets. That is, a dry sheet 17 may be followed by a latent wetting sheet 18. Notably, consecutive latent wetting sheets 18 are separated by one dry sheet 17 in this embodiment. However, it is noted that multiple dry sheets 17 may be disposed between consecutive latent wetting sheets 18. Additionally, as shown in FIG. 2C, the devices 10 in consecutive latent wetting sheets 18 are staggered along the width of the sheet.

The present invention also contemplates using different size paper sheets. Larger sheets may include one or more devices 10 if the application requires additional wetting. The dispersion of dry sheets among latent wetting sheets may be adjusted based on a particular application for which the system is designed.

Description of Materials

The device 10 as noted above is comprised of a top 47 and a bottom 48 made of thin, pliable thermoplastic material. Materials suitable include, but are not limited to, acrylic, ABS, Nylon, PVA, PLA, polycarbonate, polyetherimide, polyethylene, polyethylene oxide, polypropylene, polyvinyl chloride, methyl cellulose, Teflon or mixtures of the aforementioned materials. These materials may be processed into film using solid pellets of the chemical composition, heating the pellets to turn them into a liquid melt. The melt can then be extruded into sheets, tubes, filaments etc., which when cooled, return to a solid configuration and then are made into materials suitable for the device.

A polyvinyl chloride based plastisol is useful for printing paper towels that will be discarded in the trash. However, in the case of toilet paper which must be discarded by flushing, there is a need for a device that quickly dissolves when contacted with water to prevent clogging septic and sewer systems. Polyvinyl alcohol polymer is suitable for this application as it quickly dissolves when contacted with water and the agent can be pH adjusted so as not to melt the PVA container. A plasticized PVA composition is generally not useful for screen printing because the print would dissolve at the first wash. Ironically, plasticized PVA is ideal for printing devices for hand wetted paper application.

The above materials may be ground into powder form and mixed with a plasticizer such as ortho-phthalate esters or non-ortho-phthalate plasticizers, so that they may be applied in substantial liquid form and subsequently heated to exceed their last annealing point to transform the liquid material into a solid state suitable for the making of the device. The aforementioned thermoplastic materials may be combined or mixed with coloring pigments in the solution state or in the powdered state. Substances to improve the biodegradability of the materials can be added when the plastic is in a liquid solution or in a dry powder state. Such additives include, but are not limited to, oxo-biodegradable additives to promote biodegradation in both an anaerobic environment and an aerobic environment.

It is desirable that the materials be optimized to limit the moisture vapor transfer rate (MVTR), to delay the evaporation of the active agent. Increasing the material's thickness improves the MVTR, but material thickness must be kept to a minimum when encapsulating the device between two plies of rolled goods. MVTR rate inhibitors include, but are not limited to, coating the plastic material, blending high barrier plastics into medium barrier plastics, using multilayer structures containing barrier layers, using barrier enhancing additives such as oxygen scavengers or nano-clays. In the embodiments described herein, the thickness of the low density polyethylene film is 12.5 µm, but this may vary depending on the application.

In the case where the device is to be used with rolled paper goods, it is desirable to individually wrap the finished rolls in MVTR protected materials such as metallized PET or metallized BoPET or metallized PP, or in moisture resistant containers with a resealable lid.

The device can be filled with all types of useful agents such as vinyl dicarboxylic acid monomer polymer, anti-microbial solutions, disinfectants, sanitizers, soaps and cleaning solutions, medicines, cosmetics, moisturizers, emollients, purified water, etc.

In a preferred embodiment where the device is encapsulated within rolled paper goods, it is desirable for the agent to be non-toxic and non-irritating to human tissue. In one preferred embodiment, it is desirable for the agent to have both cleaning and anti-microbial properties. It is also desirable for the agent to be viscous and free flowing. A cP, centipoise, of less than 1 is preferred. A cP of less than 1 is a relatively inviscid fluid that allows for a rapid transfer of the liquid agent onto the paper after the device is opened by hand. The suffusion or absorption onto the paper may be enhanced by making the paper more absorbent by increasing its capillary action. There are several methods to enhance the capillary action which are known to one skilled in the art. These include, but are not limited to, optimizing the composition of the paper materials and the way they are formed into a sheet, chemical additives to the paper sheets and changing the surface of the paper by embossing to increase the loft and texture of the paper.

It is also advantageous, when the device is used for wetting rolled paper goods, to increase the wetted strength of the paper to limit paper deconstruction and pilling, and to increase the burst strength of the wetted paper.

In another preferred embodiment where the device is encapsulated by plied paper, it is desirable to intermittently add the device to selected perforated sheets so that some sheets not containing the device may be used dry, the same as standard dry paper, where dryness, softness, absorbency and texture are required for moisture blotting and/or the initial removal of soil.

In a preferred embodiment, the perforated sheets containing a device are sized or treated to increase their wet strength. In another preferred embodiment, the opening slit on the device is positioned perpendicular to the length of the roll so as to reduce stress on the frangible resealing adhesive when the paper goods are rolled.

Testing

[The focus has been on the use of the device with roll goods for the latent wetting of matter. Dry toilet tissue on a roll is by far the largest potential market for the latent wetting device. The potential for paper towels on a roll with latent wetting, although not as large as the toilet tissue market, is significant.

Considerations for the latent wetting of dry roll goods:

Microcapsules described in prior art references such as U.S. Pat. Nos. 7,914,891, 8,192,841, WO 2000070009, and US 2007/0071537 are described as spherical in shape, but are not well suited for latent wetting roll goods.

The term micro is misleading. Micro refers to objects less than one millionth of a meter. A capsule of this size does not hold an amount of liquid useful for wetting. The above cited art does not specifically deal with how the capsules are opened. Opening is referred to as triggering events such as applied pressure, atmospheric pressure, temperature, moisture, pH or contact with a specific substance. Opening using one hand only is the only practical way to open capsules when considering latent wetting of dry roll goods. Triggering events as previously described require tools, contrivances, machines and devices which are costly and impractical to use with commodity products such as dry toilet tissue and dry paper towels on a roll.

Figure 3A:
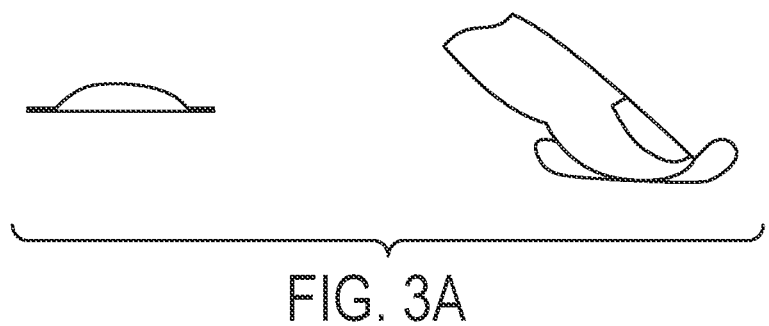
FIGS. 3A-3B describe effects of comparative examples.

Plastic material, holding a liquid, when shaped into a small container such as a capsule, pouch or vesicle tends to stretch when hand squeezed or pressed. Like a rubber balloon, plastic materials tend to deform under pressure without breaking. (See FIG. 3A.) The smaller the capsule, the more difficult it is to hand open by pressure, as small capsules indent or compress into one's finger or thumb rather than rupturing. Extreme pressure, exceeding what is practical by hand, is mostly needed to rupture small plastic capsules.

Figure 3B:
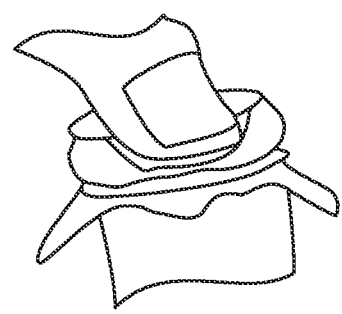

Tests were performed to find a way to hand rupture thin sheets of plastic materials such as polyethylene LDPE. As shown in FIG. 3B, the testing was performed by stretching an LDPE sheet over a 2 cm diameter bottle top and attempting to rupture the material overlying the opening by using a digit. In all cases, instead of rupturing, the plastic material stretched and indented into the opening rather than breaking. As plastic sheets are made thinner, their elasticity increases, making hand rupture even more difficult.

Reducing the wall thickness of a plastic pouch as described in US Published Application 2007/0071537, by "thermal scraping", is not possible for use in roll goods. The pouch of the above referenced patent is encapsulated between two materials and twisted at the ends of the "rolled" product. Upon twisting, the wiper was partially saturated with a cleaning solution and used to wipe dirty hands. This method of twisting would damage roll goods, is time consuming, and requires two hands, which is not suitable for use with rolled paper goods.

Figure 4A:
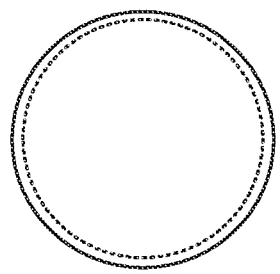
FIGS. 4A-4D show various configurations tested for rupture.

In a comparable example, attempts were made to weaken the plastic material stretched over the 2 cm wide bottle top by punching closely spaced holes with a pin around the periphery of the opening, FIG. 4A, and pressing on the material with a digit. The holes would later be sealed. The test was not successful.

Figure 4B:
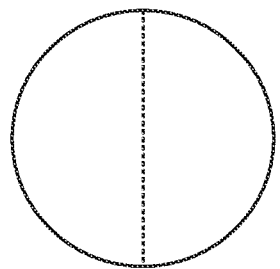
Figure 4C:
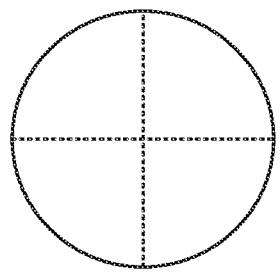
Figure 4D:
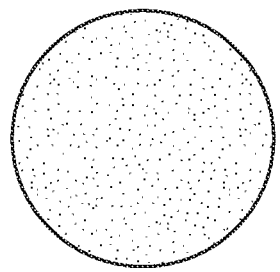

Other pinhole patterns were also tested, (FIGS. 4B, 4C and 4D), again without the material breaking under hand pressure. These configurations include pinholes around the circumference of the material (FIG. 4A), in a diametric pattern or patterns (FIGS. 4B and 4C), and throughout the outer surface of the material (FIG. 4D).

Figure 5A:
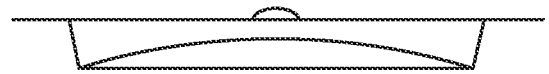
FIGS. 5A-5C show effects of applying various amounts of adhesive to a slit on rupture pressure.
Figure 5B:
Figure 5C:
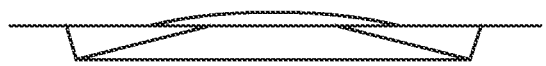

However, it was discovered that by cutting a slit portion 49 (see FIG. 1D) with a razor completely through the top 47 of the plastic material of a length approximately 75% of the opening diameter (1.5 cm), and resealing the opening slit portion 49 in the LDPE with liquid methylene glycol and allowing the sealant to dry, the cut-through slit portion 49 in the polyethylene was rendered water tight. Tests were conducted increasing the amount and area of the methylene glycol used to cover the slit as shown in FIGS. 5A, 5B and 5C. It was found, in each case, the seal was sufficient to render the container watertight. Increased application of the sealant slightly increased the pressure needed to rupture the sealed slit by hand. Pressure to break the seal ranged from 6 to 8 lbs. If the slit size is x, the sealant could range from x+0.01 mm to x+0.10 mm or higher, to provide the desired opening function and to reduce unintended release or leakage of the agent. Accordingly, the material and the coverage area of the material in combination with the slit provide structure to control the amount of force required to activate the device 10 to perform wetting of the dry paper goods.

An ovoid gel cap (5 mm×7.5 mm) containing a liquid was tested to see if it would rupture under hand pressure. Extreme pressure, over 50 lbs., exceeding the limits of practical hand pressure, was needed to rupture the capsule. When the rupture did occur, it was forceful, ejecting a stream of liquid several centimeters away. No suitable capsules made from wax or compacted materials and holding a liquid were located for testing. The shells of small capsules made from hard non-plastic material would tend to break and fragment into shards which would deconstruct or pill wetted paper materials, and litter and contaminate the user or the object being cleaned.

Micro or small capsules holding a liquid in a spherical shape are not practical to hold wetting agents for rolled goods. Besides being difficult to open by hand, a spherical shape does not bend to the changing diameter of rolled goods and a spherical shape large enough to hold a meaningful amount of liquid for wetting would be too bulky for use in rolled goods.

Tests show that 0.5 ml of a wetting agent such as water, (0.9 cP at 25 degrees C.) [cP is centipoise, a measure of dynamic viscosity] will provide good wetting for enhanced cleaning by forming an approximate 5 cm diameter wetted spot, 3 to 4 seconds after hand rupture. A container 2 mm×2 cm in diameter holds approximately 0.5 ml of liquid agent. In the case of 2 ply toilet tissue, 12 latent wetting sheets using the said device would increase the diameter of a roll less than one inch. Conversely, 12 latent wetting sheets using a spherical container holding 0.5 ml of liquid would cause objectionable bulging and increase the diameter almost 3 inches. (Rolls being referred to are standard 4" wide by 4" in diameter rolled on a 1.75" diameter paper tube.) Using a multiplicity of smaller diameter capsules to prevent bulging is not practical due to higher manufacturing costs; and the amount of time needed to hand open a number of capsules to provide sufficient wetting would be too time-consuming.

It is found that a thin device that is flexible to continually conform to changing roll size and prevent excessive bulging is desirous for the latent wetting of rolled goods.

The amount of wetting agent can be adjusted, but it has been found that 0.5 ml provides good wetting for roll goods without overly increasing the roll diameter. A range of wetting agent could be from 0.025 ml to 2 ml when considering 4" square perforated toilet paper sheets or 11"×10.5" paper towel sheets. Increasing the amount of agent does not effectively increase the usefulness of wetting required and can create problems such as over wetting, increased wet pilling and/or digit punch through and requires larger, bulkier packages which may not fit existing dispensers.

When the device is encapsulated, it is preferable that the agent is of low viscosity, e.g. less than 1 cP, to allow rapid capillary action. Highly viscous fluids or emollients are not well suited for latent wetting when used with roll goods. However, when the device is used separately, almost any type of non-irritating liquid can be used, as capillary action is not required for spreading. The thickness of the component materials comprising the device may also be increased to improve the MVTR without compromising the usefulness of the device.

The spread of the agent onto a paper material by capillary action and the wet strength of the paper can be enhanced with the addition of certain paper additives along with the application of certain resins, and embossing.

Testing Protocol

Figure 6A:
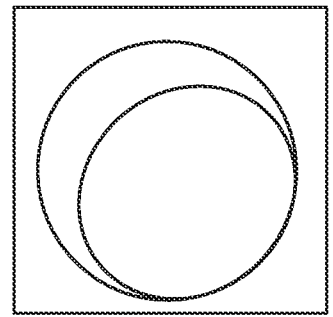
FIGS. 6A-6D and 7A-7B describe a configuration for a testing protocol.
Figure 6B:
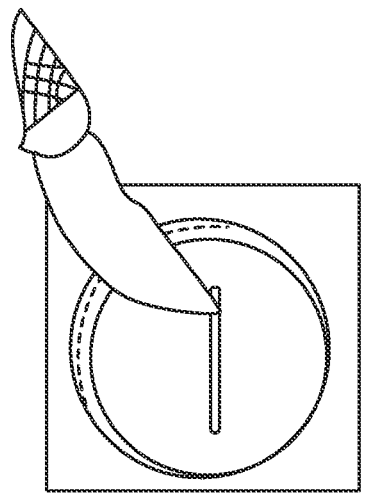
Figure 6C:
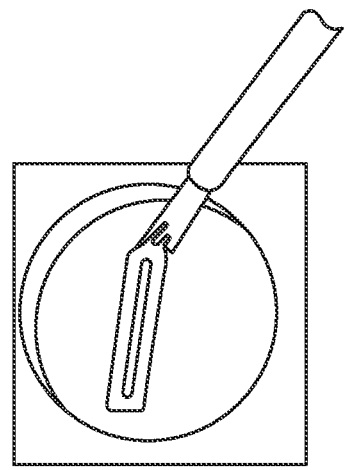

A roll of bubble wrap made from polyethylene, LDPE, film containing sealed hemispherical chambers 2 cm. in diameter by 5 mm. in depth was cut into individual pieces. See FIG. 6A. A 1.75 cm long slit was made using a razor knife on the top flat side and the device was deflated to approximately 2 mm. in depth as shown in FIG. 6B. The slit in the top was then sealed by brushing on an application of methylene glycol liquid and allowing it to dry. See FIG. 6C.

Figure 6D:
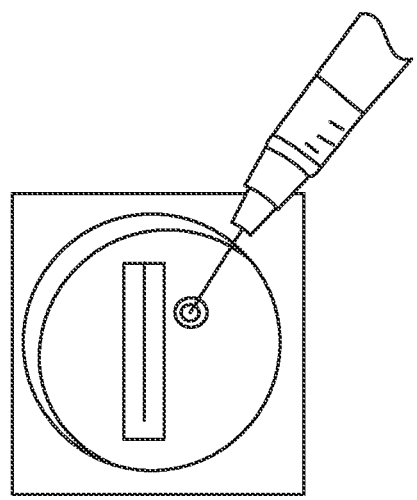
Figure 7A:
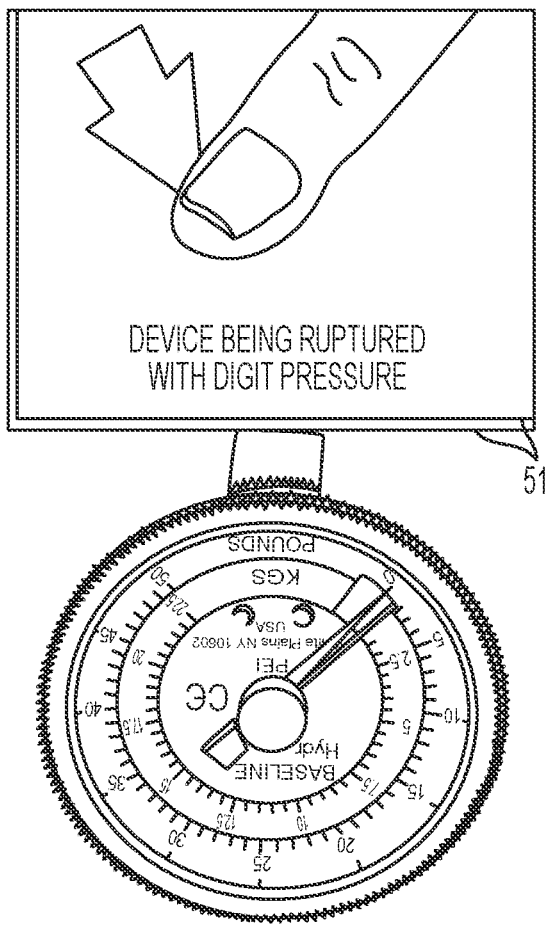
Figure 7B:
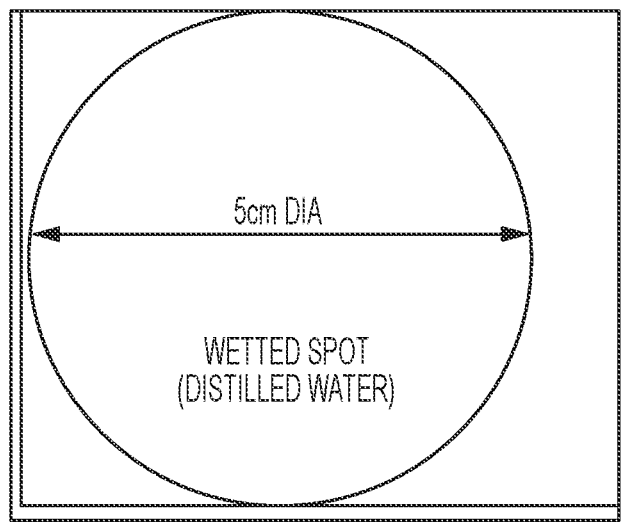

Using a 1 ml capacity syringe filled with 0.5 ml of distilled water, the deflated device was filled with the 0.5 ml of distilled water. The small syringe hole was then sealed with methylene glycol and allowed to dry. See FIG. 6D. The filled device was placed between two single ply sheets of paper towel and inserted and positioned onto the top button of the hydraulic pinch gauge as shown in FIG. 7A. Next, thumb and forefinger pressure were used to rupture the device located between the two paper sheets. The device easily ruptured with approximately 6 lbs. of pressure and the distilled water was released and spread to form an even 5 cm diameter wetted spot on both the top and bottom of the paper towel in less than 4 seconds. FIG. 7B.

Testing Conclusions

Pouches, capsules, containers, or vesicles made from flexible materials need to bend and conform so they can be incorporated into rolled goods. Plastic materials, due to their inherent elasticity, tend to stretch under hand pressure instead of rupturing. The thinner the material, the more difficult it becomes to hand rupture—the material tends to stretch more easily when thin. The thickness of the material influences MVTR and its ability to be shaped into a container of the device. A range of practical thickness would be approximately 1-30 microns. Consequently, merely forming a thin spot in the material does not function to provide controlled rupture, is not practical, and actually decreases the rupture potential of a plastic material (the thin portion expands more easily). Additionally, uniformly sealed pouches, capsules, containers or vesicles ruptured by hand pressure tend to eject a forceful stream from the point of rupture and away from the area intended to be wetted. It also becomes difficult to regulate at what pressure the containers will break. Weakening the seams or forming weak spots as described US Patent 20070071537, can cause leakage and exacerbate the tendency of the liquid content being expelled in a forceful stream away from the area intended to be wetted, the weak spot, can also negatively impact the MVTR. Resealed slit(s), when pressed or squeezed by a digit(s), open, allowing a rapid and non-ejecting emptying of the liquid agent from the device by gravity and/or capillary action.

Spherical capsules holding enough liquid for sufficient wetting are not practical for rolled goods because they create undesirable bulging. Capsules made of materials that shatter into fragments when subjected to hand pressure create contamination and litter and are not practical for the latent wetting of rolled goods. Increasing the number of capsules, such as micro capsules described in conventional art, increases the cost to manufacture, the possibility of accidental leakage, makes them more difficult and time consuming to hand open; and increases the likelihood that fragments from the ruptured small capsules will damage and deconstruct the wetted substrate and cause litter and contamination, and or irritation.

Manufacturing

High-speed continuous manufacturing is the crucial component in keeping costs low enough to create high demand and continued growth. Manufacturing for the invention is similar for both toilet tissue on a roll and rolled paper towels. Two manufacturing methods are disclosed herein: (1) the first methodology entails a separate preparation of devices 10 containing a liquid agent, and introducing those devices during the continuous manufacturing of rolled paper goods; (2) the second methodology entails the manufacture of devices concurrent with the manufacture of rolled paper goods.

The first method is suitable for both single ply paper goods and multi-ply paper goods. The second faster and more economical method is designed for two ply paper goods, which make up the bulk of both toilet tissue and paper towels. Because toilet paper and paper towels are commodity products that are produced in high volume, cost competiveness is an important factor. The latent wetting device is designed for both low-cost manufacture and low material cost.

Toilet paper and paper towels are usually made by hi-speed continuous manufacturing machines. First, large rolls of single ply paper are made from paper pulp. The pulp is generally made from recycled paper. Rolls are typically 65" wide×60" in diameter. A 65" wide roll makes 16 each 4" wide toilet paper rolls by sawing the large roll into separate rolls. To make two ply paper rolls, two large 65" wide×60" diameter single-ply rolls are creeled onto a winding-type machine one over the other, where they are subsequently plied together. The plied paper is then embossed, perforated into tear away sheets and rolled onto a cardboard paper tube or rolled up tubeless, or folded. The 65" wide roll is then cut into multiple smaller width packages, and wrapped for sale.

One embodiment for manufacturing the latent wetting device is for the device to be manufactured concurrently with the manufacture of two-ply paper on a roll as described above is shown in FIGS. 9, 10 and 11A-11F.

Figure 8:
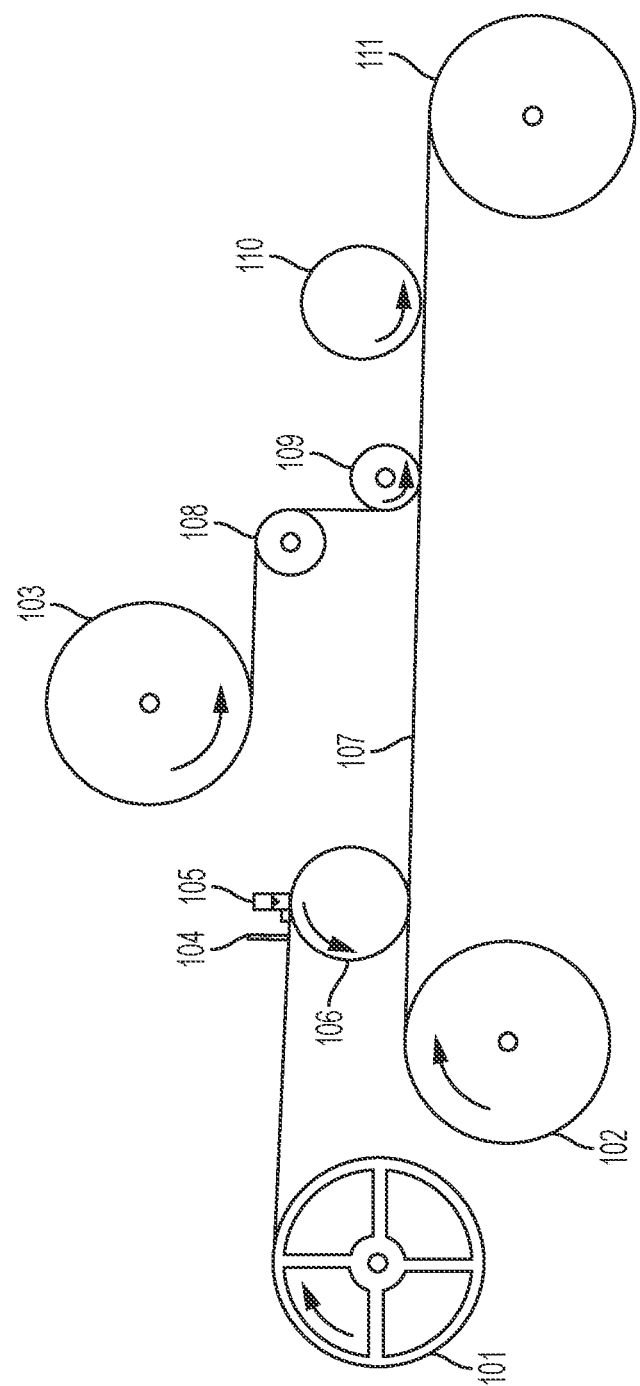
FIG. 8 is a schematic for manufacturing a hand wetted roll paper in accord with an embodiment.
Figure 12:
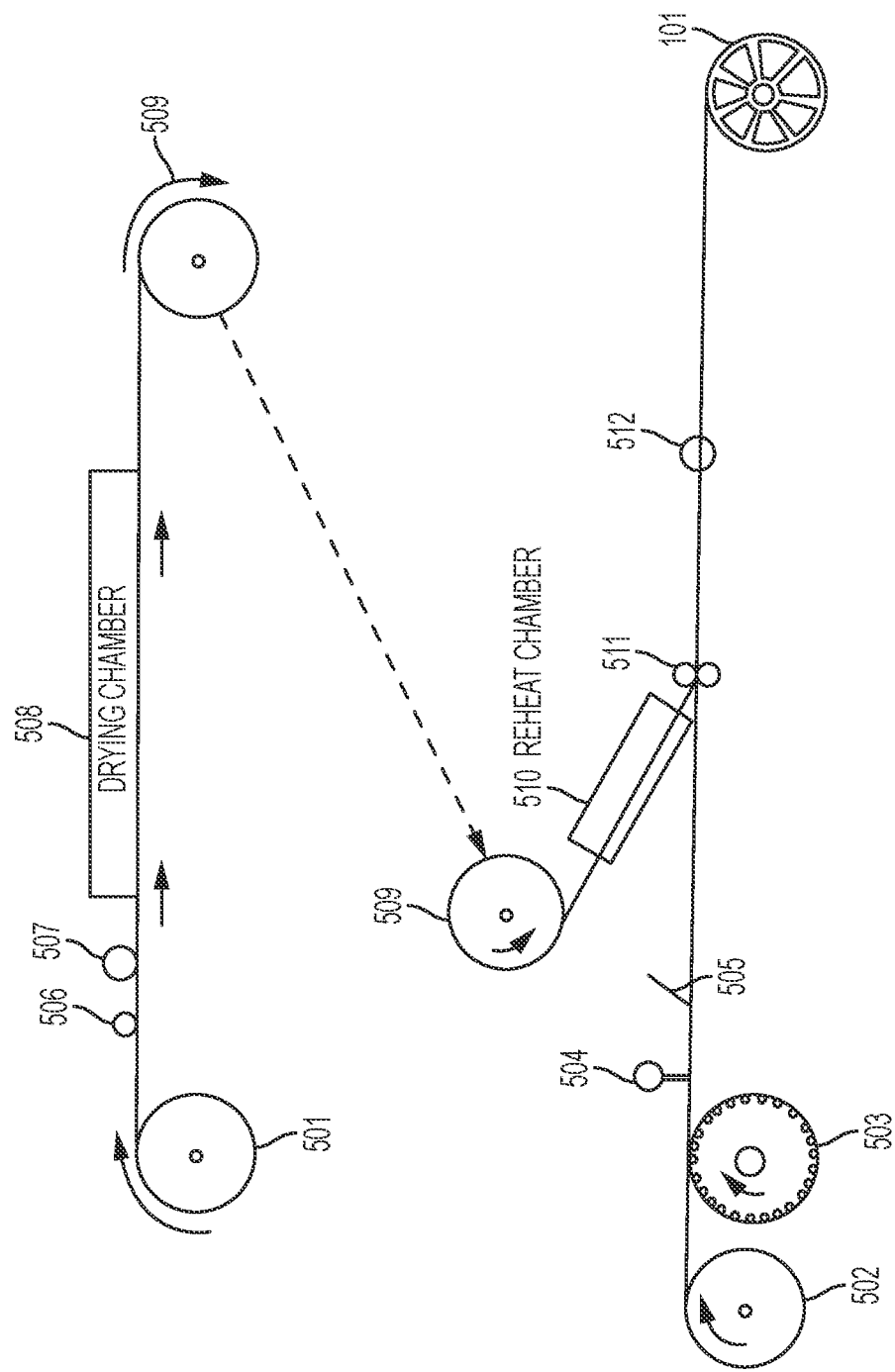
FIG. 12 shows a method for manufacturing a continuous sheet of hand wetting devices in accord with an embodiment.
Figure 13:
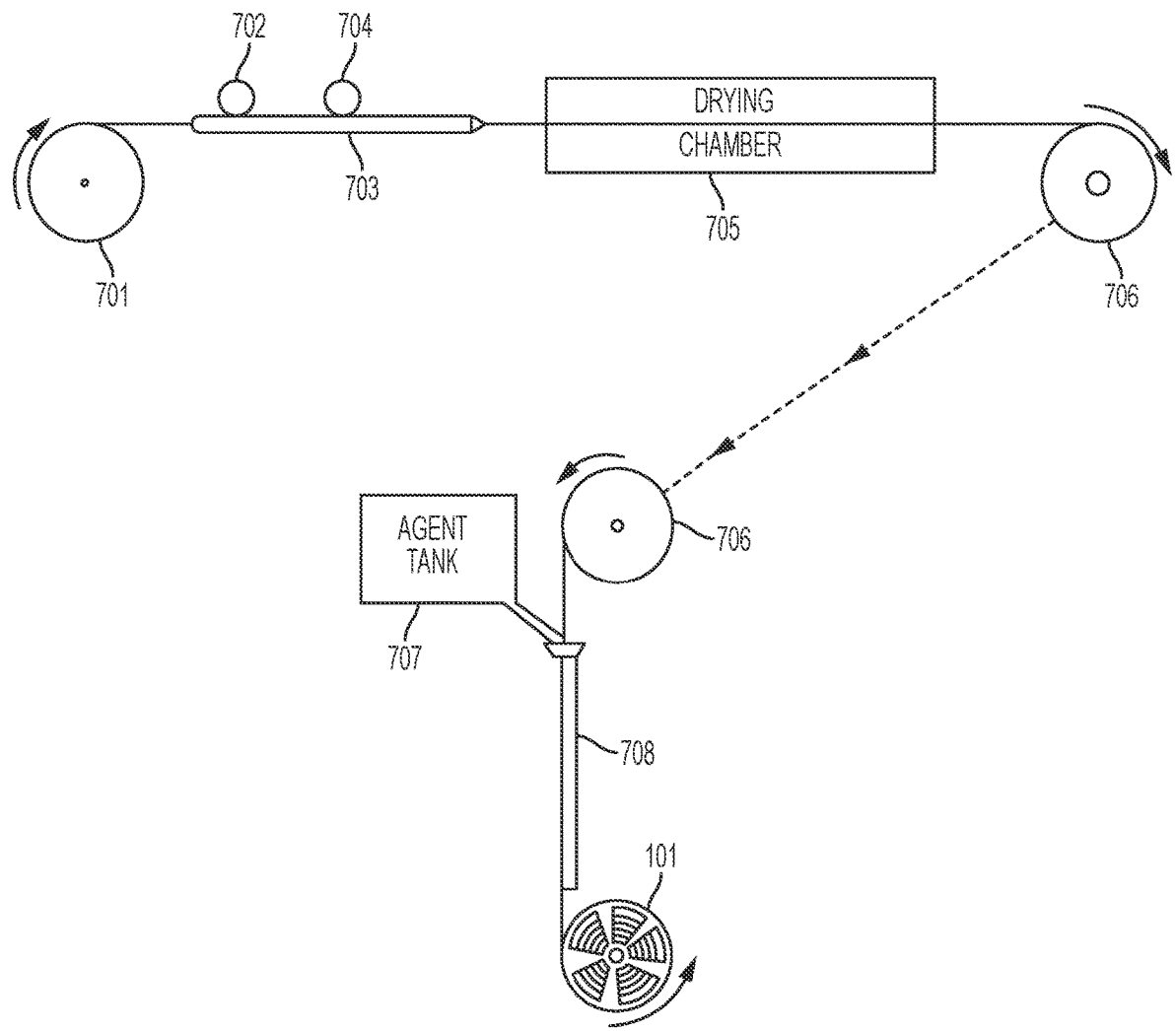
FIG. 13 shows another method for manufacturing hand wetting devices.

Another embodiment for manufacturing the latent wetting device is for the hi-speed manufacture of multiples of the device on a 65" wide plastic substrate which is subsequently cut into strips the width of one device and wound onto reels for insertion during the continuous manufacture of paper roll goods as shown in FIGS. 12 and 13. The reels 101 are shown on FIG. 8. The devices are creeled between a bottom paper ply 102 and a top paper ply 103 on a winding-type two ply paper roll manufacturing machine. Individual wetting devices 10 are cut from reels 101 and adhered to the top side of paper roll 102 by means of an adhesive dispersed from adhesive nozzle 104. The devices 10 are cut using an individual cutting device 105 and then air-assisted onto a deposition drum 106 where the devices are subsequently adhered to the top of the roll 102 after being rotated by the drum 106 to contact the paper ply from paper roll 102. The devices move along the top of paper ply 102 (See 107). The devices are then encapsulated when pressed between roller 109 with a paper ply from top roll 103. After encapsulation, the two-ply roll is perforated by a perforating roller 110, and wound onto roll 111.

FIG. 12 shows an embodiment where the device 10 is manufactured using a 65" wide plastic sheet to form a reel 101 for use in the prior embodiment. First, a 65" wide plastic sheet roll 501 is unwound and the plastic sheet is slit by opening slitters 506 to form an opening slit. The slit is then sealed using an adhesive applicator 507 and then dried in a drying chamber 508. The plastic sheet is then wound to form finished roll 509. This roll 509 is loaded into a follow on process to be joined with another plastic sheet roll that is formed into a concave shape (hemisphere, cup shape, etc.) and filled with an agent. As shown in FIG. 12, the plastic roll 502 is unwound and a vacuum roll 503 pulls a vacuum on the sheet to form the concave shaped container bottoms. These container bottoms are filled with a liquid agent using a nozzle 504 and any excess agent is doctored or squeegeed 505 from the surface. The upper plastic sheet from roll 509 is reheated and then joined to the bottom plastic sheet having the containers filled with liquid agent at joining rolls 511. The joined sheet is then cut using a slitting saw 512 and wound to form reel 101.

It is noted that in the case of a device 10 having the side slit structure of the embodiment shown in FIGS. 1E-1G, the slit 49 can be formed on the bottom container and the frangible adhesive applied to the bottom container.

Still another embodiment is for the manufacture of a separate single reel of the latent wetting device 10 using a Vertical Form Fill and Seal Machine. (Shown in FIG. 13). This method of manufacture is suited for development, samples, trial runs and single devices packaged in a container so that the devices can be used separately to wet matter. A flattened tube the width of one wetting device is fed from roll 701 over a metal mandrel 703 whereby it is formed into a tubular shape. An opening slit is formed at 702 and sealed with a frangible adhesive at 704. The tube is dried in chamber 705 and rolled on take up 706.

Take up roll 706 is creeled atop a vertical Form Fill and Seal machine as shown. The tube is heat sealed across its bottom width water tight at 708 and left open across its top width to receive an amount of liquid agent from tank 707. The agent is collected above the bottom seal. The tube is then sealed across its top width above the agent. The process repeats and the filled pouches are wound onto roll 101.

Concurrent Manufacture of 2-Ply Goods

The continuous process-formation of devices by printing, drying (stentering), slitting and shape forming, filling with frozen agent and sealing the top and bottom parts together provides high-speed, low cost manufacturing, and low material cost. In addition, it allows sequencing devices within the roll according to need, e.g. (one latent wet sheet per 9 dry sheets for light use, one latent wet sheet per 7 dry sheets for medium use, or, one latent wet sheet per 5 dry sheets for heavy use, etc.). Devices can be printed staggered side-to-side for a flatter roll up. Devices can be made to hold different amounts of agent, and the hand-opening force can be calibrated for easy manual opening or, leaving the sheets intact for dry cleaning according to consumer needs. Sheets containing devices can be accumulated for extra cleaning, or used as dry sheets. The continuous manufacturing sequence can also be altered according to need.

Figure 9:
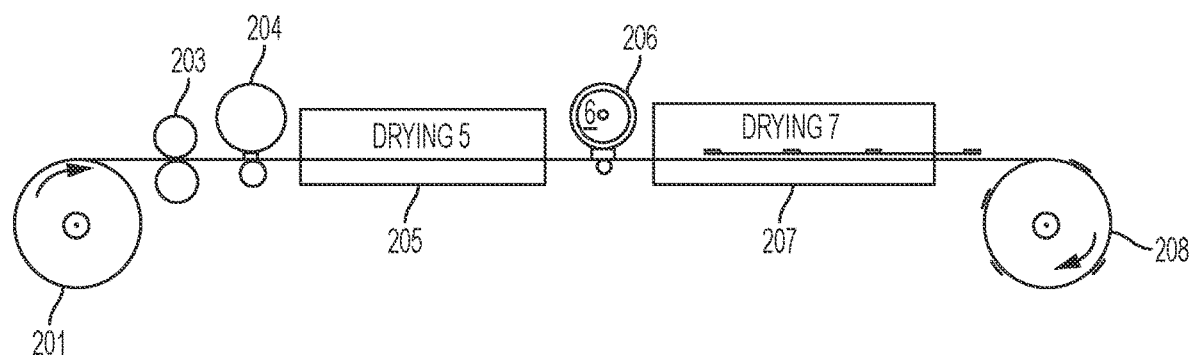
FIG. 9 shows a schematic for printing a plastic disk on a sized sheet in accord with an embodiment.

Referring to FIG. 9, a continuous roll of single-ply paper, (either toilet tissue or paper towel) is unrolled from the top of let-off roll 201. In this case, the roll is 65 inches wide by 60 inches in diameter. The roll 201 is creeled for a top let-off, clockwise rotation, and the paper travels left to right. The paper passes through embossing rolls 203 to emboss a pattern, design/logo etc. on the paper for extra loft, softness and absorbency. Next the single-ply paper passes under a sizing roll 204 where it is selectively sized (for example every 10th sheet) with a wet strength resin to give the paper additional wet strength. The paper travels through a drying chamber (stenter) 205 to dry the sizing. Next the paper is selectively printed with a plastic disk over the sized sheet by a rotary screen or gravure printing roll 206.

To form the plastic disk, a suspension of powdered plastic particles in a liquid plasticizer may be used. This suspension flows as liquid at room temperature so it can be selectively applied to a moving single ply paper by such means as rotary screen printing. When the printed part (disk) is heated to approximately 180 C and subsequently cooled below 60 C, a solid plastic disk results. Such a disk is printed on the moving top side of the bottom single ply paper as it is being manufactured. This disk is then pressure embossed to form a shallow container. The moving container can then be filled with a frozen charge of liquid cleaning/sanitizing agent.

Alternatively, the printed part may be formed on the single ply paper after the single ply paper is embossed to form the shallow container shape, and thereafter the embossed portion forming the shallow container shape is printed with the liquid plastic material (e.g. PVA or the like) to form the bottom container. Because cured plastics can be spongy, this alternative may permit more control in forming a particular shape as the bottom paper ply exhibits less bounce back after embossing. Consequently, after this shape is formed, the liquid plastic (PVA or the like) is printed over the shape and cured into form thereafter. Further, in the event the plastisol is brittle after being formed, this method can prevent cracking of the bottom container by the embossing process.

While or after the bottom container is being formed, the top disk is printed on the underside of the moving top paper ply so that an open space or slit is left unprinted on the disk. This slit is subsequently coated (printed) with a frangible adhesive to seal the top slit or in the case of the embodiment of FIGS. 1E-1F, the side slit of the bottom container would be sealed. The flange on the bottom disk is coated (printed) with a sealant (or caused to partially melt either by means of heat or chemically). Alternatively, the adhesive may be applied to the top, as noted in FIG. 1F above. The top and bottom parts are brought together. The periphery of the top disk coinciding with the flange on the bottom disk is pressed together to seal the frozen agent within the device. The agent subsequently melts and is ready for use.

With regard to FIG. 9, the plastic melt flows together, making a solid disk which penetrates and adheres to the single ply paper. The plastic disk is dried in the drying chamber 207 and rolled up on take up roll 208. Thus, a plastic disk is integrally formed on the surface on the single ply paper. Additionally, to lessen the MVTR (moisture vapor transfer rate), a specialized coating can be applied over the dried plastic-type disk and dried before roll up on roll 208. Alternatively, special materials may be added to the plastic solution to impede evaporation.

Figure 10:
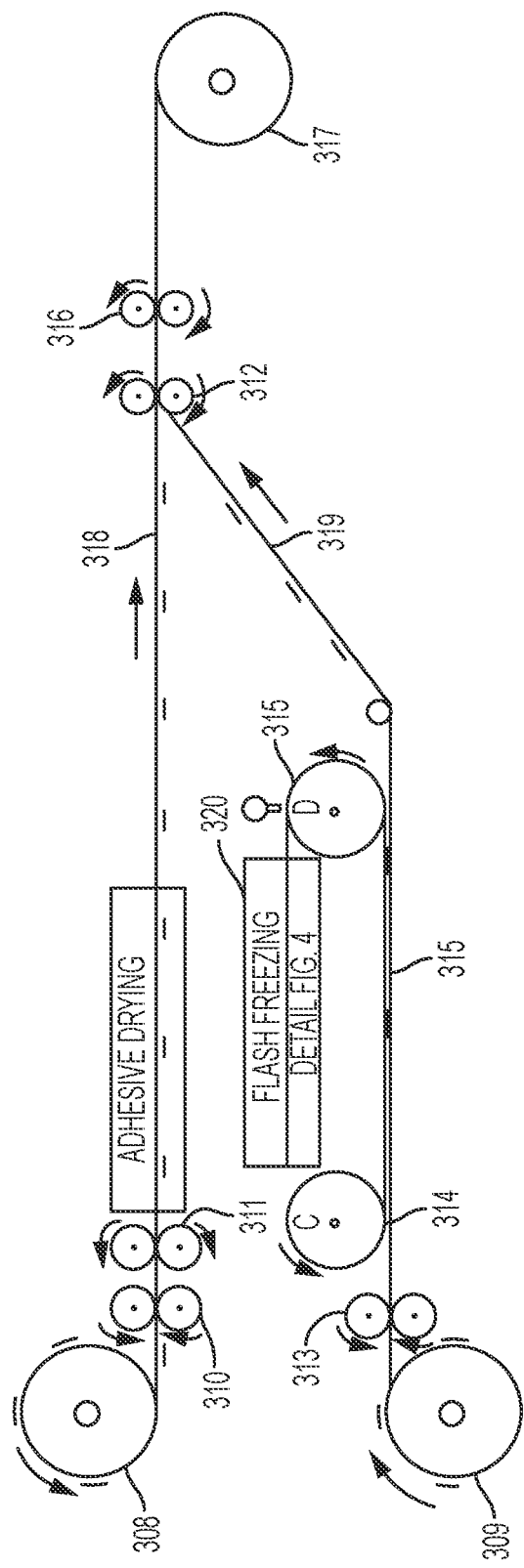
FIG. 10 shows a schematic for forming a two ply roll in accord with an embodiment.

Next, as shown in FIG. 10, a two-ply paper roll is formed. Two rolls manufactured in accord with the process of FIG. 9, are creeled top and bottom to later form a two-ply paper roll. The top roll 308 unrolls from the bottom, while the bottom roll 309 unrolls from the top. The unwinding let off point of rolls 308 and 309 are exactly synchronized.

Referring to the top ply: The single ply roll 308 containing the plastic disks placed over the sized sheets is fed through a knife roll 310, which cuts a slit through the plastic disks. Next, an adhering roll 311 applies adhesive over the slit, sealing it shut and making it water tight. Adhesive can also be applied around the periphery of the disk at roll 311 if required to aid in joining corresponding disk from the top and bottom rolls. The paper from roll 308 continues to the right in FIG. 10, where the top ply 318 is joined with the bottom ply 319 by adhering the periphery of the top disk to the flange of the bottom disk container at joining rolls 312 to seal the disks in a liquid tight manner.

The process of preparing the bottom ply 319 prior to joining is now described. The paper from the bottom roll 309 travels to the right in the figure, through embossing/molding rolls 313 where the plastic disk over the sized sheets is embossed/molded into a container with a flange around its periphery. Next, the open container formed by the molding/embossing and riding on the top of the bottom single paper ply travels to the right in the figure and passes under roll 314 where it is filled with an ejected frozen hemisphere of agent. Next, a doctor blade 315 removes any excess agent from the container's flange. The open top container continues to joining rolls 312, where the top of the container and the bottom of the container (which form the device 10) are sealed together in a liquid tight manner while being encapsulated between the top paper ply 318 and the bottom paper ply 319. The two-ply paper is then perforated by perforation rolls 316 and rolled up at roll 317. Roll 317 is subsequently cut into 16 ea. 4" wide separate rolls and packaged. Goods could be plated instead of rolled.

Flash Freezing Device

The flash freezing device 320 is described in detail with reference to FIGS. 11A-11F. A strip of flexible (concave or convex) cups 418 are attached and arranged across the width of a metal mesh tractor belt 419. The mesh tractor belt 419 is threaded around driven rolls 314 and 315. The speed of the tractor belt is synchronized to match the travel speed of the bottom paper ply 319. When the row of cups 418 is at the top dead center of roll 315, the cups 418 are all filled with a liquid agent pumped from a container (not shown) in which the agent has been super-cooled to a temperature just above freezing into a fill bar 421, which extends across the width of the tractor belt 419. The tractor belt width matches the width of the under-riding paper ply 319.

The filled cups pass toward the left in the figure under a diagonal squeegee where any excess agent is removed 422. The row of cups 418 continues to the left into a flash-freeze chamber 429 where the agent is frozen solid. As the row of filled cups 418 exits the flash-freeze chamber 429, a doctor blade 423 removes any excess frozen agent from the cup flanges. The cup row is now rotated counter clockwise at roll 314 and passed under a circular guard flange 324 to prevent the frozen agent from falling out as the cups are inverted 180° at the bottom of roll 314.

When the cup row reaches bottom dead center of roll 314, an internal spring-loaded ejector cam 425 inverts the cup 418 from concave to convex, ejecting the frozen agent hemisphere into the bottom container 426. The arrival of the open container atop the bottom of the single-ply paper is continuously calibrated to coincide with the timing of the frozen agent ejection. The filled container 426 passes another doctor blade 427 and moves toward joining rolls 312 (FIG. 10). The convex row of flexible disks is reset from convex to concave for another filling of agent with reset cams 428.

Figure 11A:
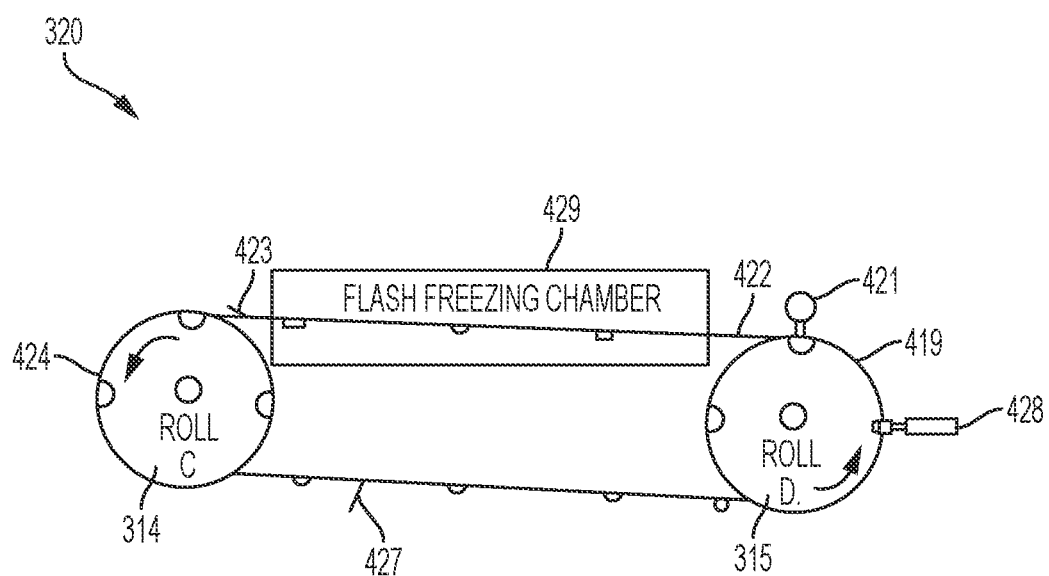
FIGS. 11A-11F describe a flash freezing device in accord with an embodiment.
Figure 11B:
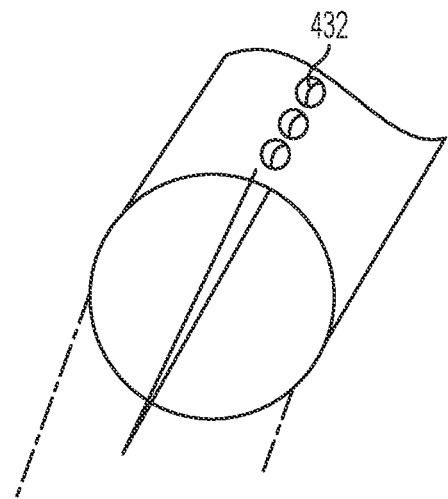
Figure 11C:
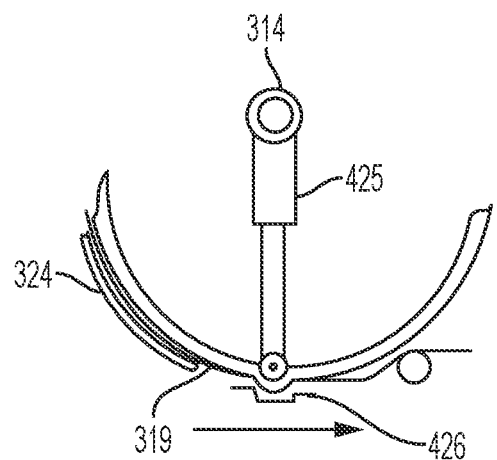
Figure 11D:
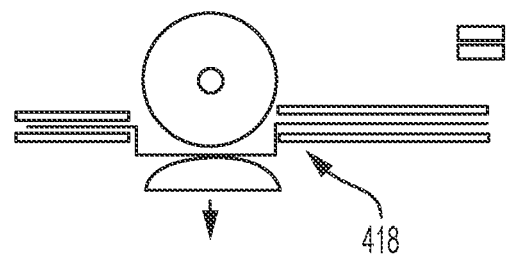
Figure 11E:
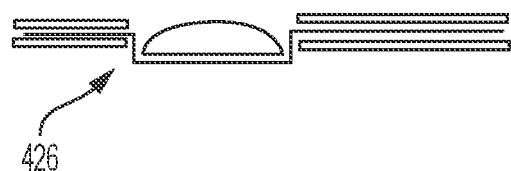

The structure of the rolls 314 and 315 and the ejector features are shown in further detail in FIGS. 11B-11F. FIG. 11B is a partial view showing the holes 432 formed along the width of the rolls 314 and 315 for receiving the cups 418. The internal portion of roll 314 is shown in detail in FIG. 11C. Roll 314 includes an ejector cam 425 for ejecting the frozen agent into the bottom container 426 (FIG. 11E). The ejector cam 425 in this embodiment is spring loaded and functions to push the frozen agent into the bottom container 426 by contacting the cup 418 into a convex shape to eject the agent (FIG. 11D). This ejector cam 425 is maintained in a constant position as the roller 314 rotates.

Figure 11F:
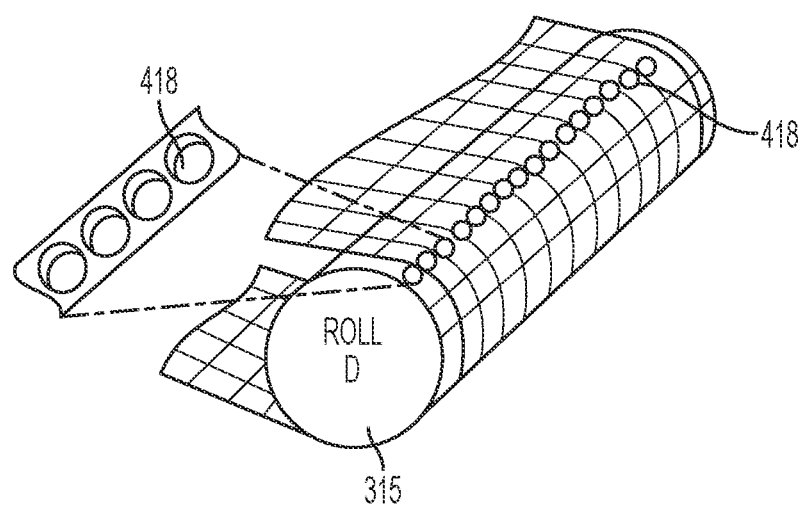

Roll 315 is shown in further details in FIG. 11F. The row of cups 418 are spaced across the width of the roll and are spaced circumferentially based on the spacing between consecutive devices 10 on the bottom ply 319.

One such manufacturing process can be summarized as follows. While this can be adapted to have the slit formed on the top, this method is explained with consideration of the side slit of FIG. 1E:

I. Preparing Roll Feed Stock (K & L) for Hand Wetted Paper with Directed Release.

| Bottom Ply | Top Ply |
|---|---|
| 1. Emboss single ply paper into a container shape. | 1. Print device top |
| 2. Print channel flange device over embossed area | 2. Cure to solid |
| 3. Cure to solid form | 3. Reroll to form roll L. |
| 4. Reroll to form roll K. | |

II. Manufacturing Hand Wetted Roll Paper

| Bottom Ply (using Roll K.) | Top Ply (using Roll L.) |
|---|---|
| 1. Print the mouth of the agent release channel with frangible adhesive seal | 1. Print adhesive around the periphery to coincide with channel flange on the bottom device |
| 2. Fill the reservoir with agent | |

Figure 14A:
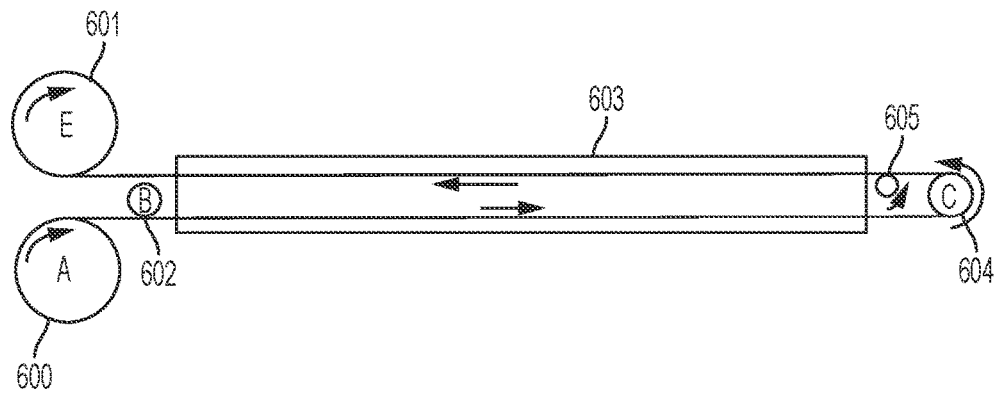
FIGS. 14A-14C show a method for condensed manufacturing of a two ply hand wetting product.
Figure 14B:
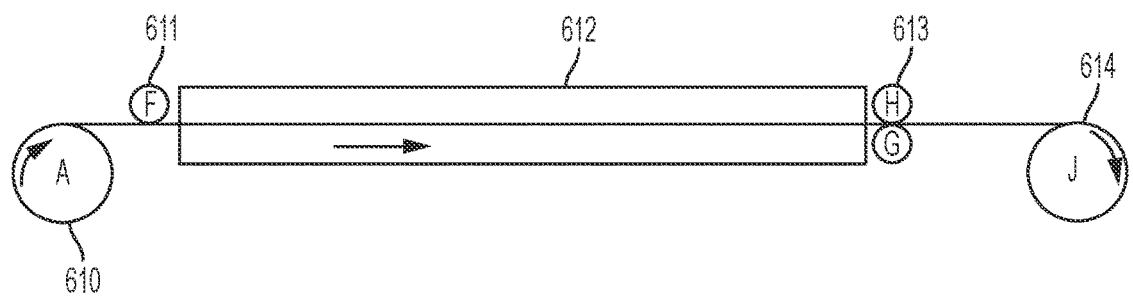
Figure 14C:
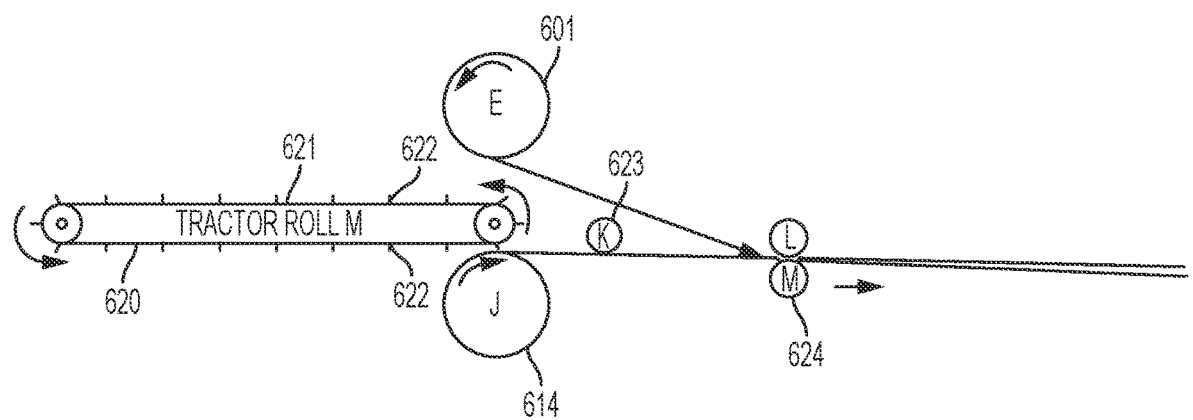

III. Combining Top and Bottom Ply
1. Press the pre-glued top of the device against the bottom devices' channel flange using die rolls.
2. Emboss around the device to attach the top ply to the bottom paper ply.
3. Perforate
4. Roll on common log
5. Split out rolls to size and package In another embodiment, a condensed manufacturing process is provided. As shown in FIGS. 14A-14C, in this method the top paper ply and the bottom paper ply are prepared with a corresponding top 47 and bottom container 48, respectively in separate processes in FIGS. 14A and 14B. Then, a filling, joining and embossing process follows in another process shown in FIG. 14C.

In FIG. 14A, a top ply is supplied from a supply roll 600 which is unwound and fed to a printing step 602, where a disk with a slit is printed on the top ply. The top paper ply with the disk having a slit printed thereon is fed to a cooling and heating chamber 603 wherein the printed disk and bottom ply are heated and cooled before leaving the chamber. After leaving the chamber, the top ply is routed over a return roll 604 which redirects the top ply back toward the chamber 603. However, before re-entering the chamber 603, a frangible adhesive is applied over the slit using roll 605. After the adhesive is applied, the top ply re-enters the chamber 603 to again be heated and cooled. After the heating/re-cooling step, the top ply exits the chamber 603 and is wound on a takeup reel to form a top ply roll 601 having a disk shaped tops with sealed slits formed thereon.

In FIG. 14B, the bottom ply is prepared with multiple device 10 bottoms for eventually mating with the tops of the top ply in FIG. 14C. First, a supply roll 610 is unwound and fed to a printing step 611 where a solid disk is printed on the bottom ply. The bottom ply with the solid disk printed thereon then enters a heating/re-cooling chamber 612 for heating and re-cooling. After leaving the chamber 612, a pair of embossing rolls 613 are used to form the disk into a bottom 48 similar to what is shown in FIG. 1B (container having sidewalls with a flange extending therefrom). The bottom ply with multiple container shaped disks formed thereon is wound on takeup roll 614.

Lastly, in FIG. 14C, the top ply and the bottom ply are unwound and joined so that the top disk having an adhesive sealed slit is paired with a corresponding bottom container to result in a configuration as shown in FIG. 1A. The top ply roll 601 is unwound and directed to joining rolls 624 to join with the bottom ply. However, the bottom ply is first directed to a filling device used to fill the bottom container with a liquid agent. The filling device comprises a tractor roll 620 that includes a belt 621 wrapped around two rollers. The belt 621 includes multiple filling apparatuses 622 spaced at predetermined intervals to match the distance between successive bottom containers on the bottom ply. The speed of the belt 621 is controlled to the same speed as the unwinding bottom ply from roll 614. After each bottom container is filled, the bottom ply is guided to an adhesive applicator roll 623 that applies adhesive to the flanges of the bottom container for bonding to the top disk of the top ply. After the adhesive is applied, the bottom container is joined to the top disk at joining rolls 624. After this joining step, the top ply and the bottom ply may be further processed. This further processing includes embossing the top and bottom plies, selective sheet sizing at portions adjacent to the device 10, slitting to create rolls of predetermined widths and rewinding to create a finished product.

While this invention has been particularly shown and described with reference to exemplary embodiments thereof, the above description should be considered as illustrations of the exemplary embodiments only and are not for purposes of limitation. Therefore, the scope of the invention is defined not by the detailed description of the invention but by the appended claims, and all differences within the scope will be construed as being included in the present invention.

What is claimed is:

1. A hand wetted paper product, comprising:
   at least one paper ply; and
   a wetting device disposed on a surface of the paper ply, the wetting device comprised of a bottom part that is formed into a container with sides and a flange, and a top part formed into a cover joined to the flange and with a sealed opening portion including a release channel formed at a part of the top part that is not joined to the flange,
   wherein the wetting device is filled with a liquid agent,
   wherein the paper ply is configured to absorb the liquid agent,
   wherein the sealed opening portion is sealed by a frangible adhesive in the release channel and configured to open before other portions of the wetting device in response to applied external pressure using a digit of a user's hand, and configured to directly wet the paper ply.

2. The hand wetted paper product of claim 1, where the wetting device has two length dimensions parallel to the paper ply that are larger than another length dimension perpendicular to the paper ply to thereby minimize bulging and allow more sheets in a given roll or package.

3. The hand wetted paper product of claim 1, wherein the wetting device is flexible so that it conforms to the changing diameter of the paper produced when wound on a roll.

4. The hand wetted paper product of claim 1, wherein a pressure required to open the sealed opening portion is regulated by adjusting a width and a length of the sealed opening portion, and by varying an amount, type and application of a frangible adhesive used to seal the sealed opening portion.

\* \* \* \* \*